(No Model.)

H. G. FARR.
UTERINE SUPPORTER.

No. 286,798. Patented Oct. 16, 1883.

Witnesses,
E. J. Stearns
G. C. Stearns

Inventor:
Hiram G. Farr,
per Norman W. Stearns,
Atty.

UNITED STATES PATENT OFFICE.

HIRAM G. FARR, OF BOSTON, MASSACHUSETTS.

UTERINE SUPPORTER.

SPECIFICATION forming part of Letters Patent No. 286,798, dated October 16, 1883.

Application filed February 19, 1883. (No model.)

*To all whom it may concern:*

Be it known that I, HIRAM G. FARR, of Boston, in the county of Suffolk and State of Massachusetts, have invented certain Improvements in Pessaries, of which the following is a full, clear, and exact description, reference being had to the accompanying drawings making part of this specification, in which—

Figure 1:
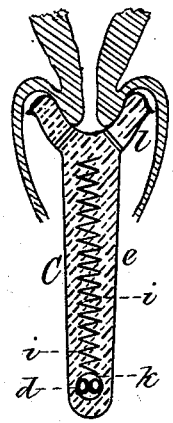
Figure 2:
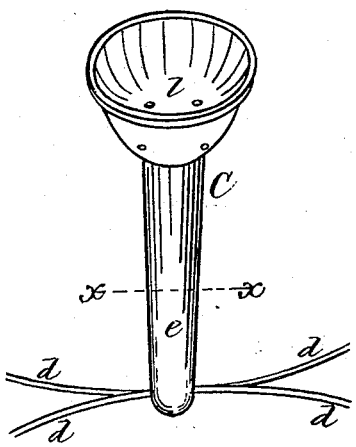
Figure 3:

Figure 1 is a central longitudinal section through a pessary constructed in accordance with my invention. Fig. 2 is a perspective view of the same, with a means of attachment to a waistband. Fig. 3 is a section on the line *x x* of Fig. 2.

My present invention consists in a pessary or uterine support, of rubber, having a spiral spring molded and embedded within its stem during the process of vulcanization, which thus permanently endows it with the requisite rigidity to support the uterus, and with sufficient flexibility to bend in order to conform to the various movements of the body, the stem being of a minimum size or area in cross-section compatible with the rigidity thus obtained, said pessary being provided with an ordinary cup-shaped socket for the reception of the neck of the uterus, and being held in place by any suitable connection leading to a waistband, belt, or girth, adapted to the form of the wearer.

To enable others skilled in the art to understand and use my invention, I will proceed to describe the manner in which I have carried it out.

In the said drawings, C represents a pessary composed of rubber, the lower portion of which constitutes a stem, *e*, centrally within which is located a small stiff spiral spring, *i*, which is incorporated, molded, and embedded within the same during the curing or vulcanizing process, the bottom of the spring being looped to form an eye, *k*, also inclosed and embedded within the rubber when vulcanized. Through this eye passes two tubular elastic connections, *d*, which are designed to lead to a waistband. (Not shown.) At the top of the pessary is an ordinary cup-shaped socket, *l*, in which rests the neck of the womb, said socket having the usual flange, *m*, at its upper edge, to insure the necessary rigidity in supporting the weight of the organ.

By the employment of the spring, located and applied as described, the stem may be of the smallest diameter compatible with the stiffness required, and, as the thickness of the rubber is considerable, (extending diametrically through the stem,) the warmth of the body does not affect it, and consequently the resiliency of the stem is permanently retained during the various flexures of the body of the wearer; whereas, with a spiral spring simply located loosely within a rubber tubular stem, the thickness of the rubber is so slight that the heat of the person soon deteriorates and renders the rubber inefficient for the purpose designed.

The eye *k* may be dispensed with, and the lower end of the stem be provided with a groove or other means of attaching the connections *d* leading to the waistband.

The incorporation, by molding in the process of vulcanization, of the rubber longitudinally and laterally into, through, and around the spiral spring produces a mutual cohesion of great tenacity between them, each re-enforcing and supporting the other.

I am aware of Patents No. 75,694 and No. 104,657 for pessaries, in each of which the stem consists of a spiral spring simply slipped into and confined within a rubber tube; but in these pessaries, as the spring is not embedded within the rubber during vulcanization, no cohesion and intimate incorporation exists between the two materials.

I claim—

As an improvement in pessaries having a cup-shape top, a stem, *e*, composed of rubber, and a spiral spring, *i*, molded and embedded therein during vulcanization, in combination with a waistband and a means of connecting it therewith, substantially as described.

Witness my hand this 2d day of February, 1883.

HIRAM G. FARR.

In presence of—
N. W. STEARNS,
O. P. PRALL.